July 4, 1933.  L. L. SLAVIN  1,916,536
CONSTRUCTION, RELATIVE TO FRAMES
Filed July 3, 1931
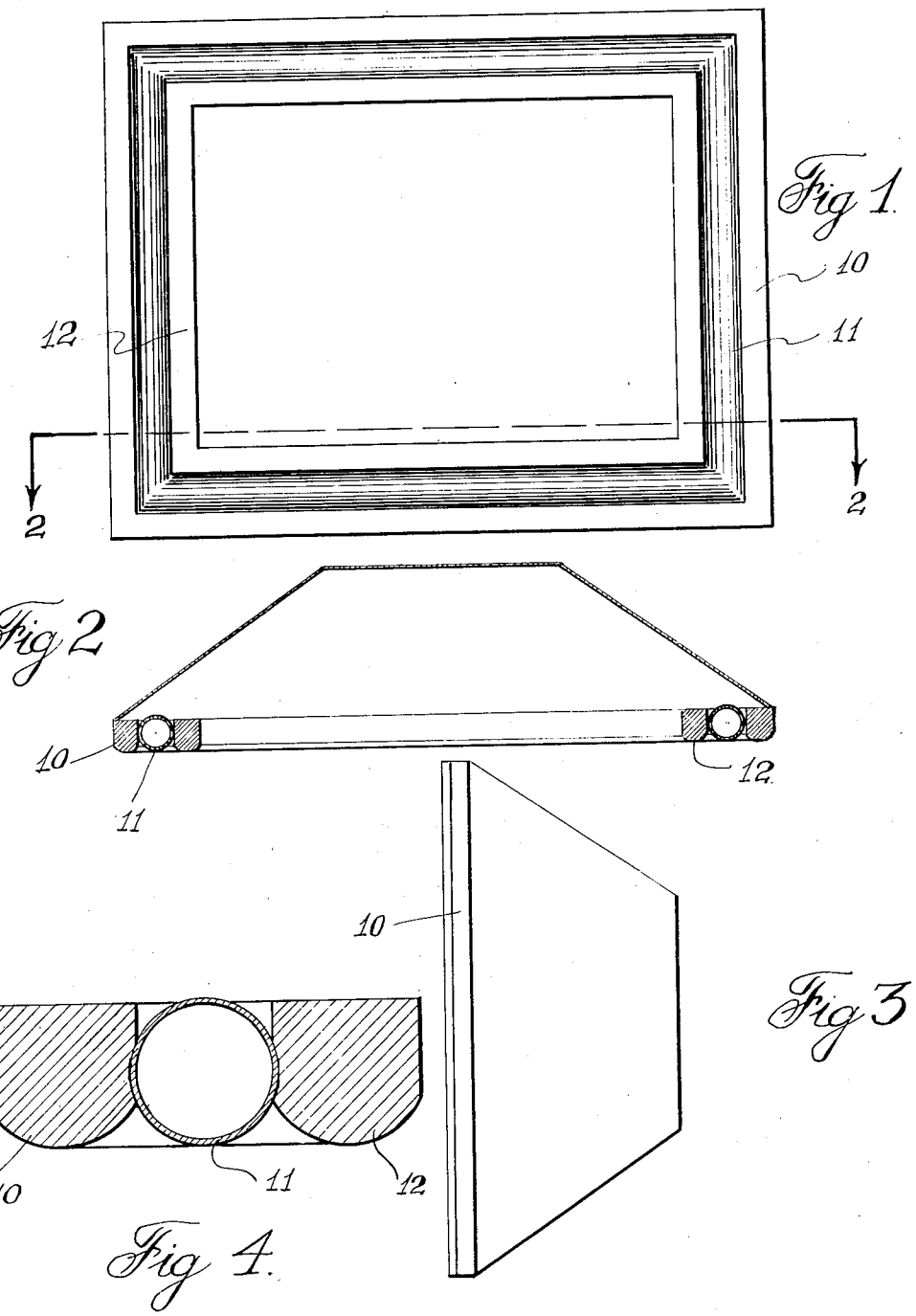
Lionel L. Slavin
INVENTOR
BY ATTORNEY Peter M. Boesery Patented July 4, 1933

1,916,536

UNITED STATES PATENT OFFICE

LIONEL L. SLAVIN, OF BROOKLYN, NEW YORK, ASSIGNOR OF ONE-HALF TO SAUL ROBINSON, OF BROOKLYN, NEW YORK

CONSTRUCTION, RELATIVE TO FRAMES

Application filed July 3, 1931. Serial No. 548,541.

This invention relates to frames in general and has for its more specific object the provision of an illuminated frame that may be used in different connections and for a great number of varied purposes, but which is especially adapted for advertising purposes.

As the construction of this device is comparatively simple the cost of manufacturing should be proportionately low.

With the above and other objects in view, this invention consists of the novel features of construction, combination and arrangements of parts, hereinafter fully described, claimed and illustrated in the accompanying drawing forming part of this application, and in which similar characters of reference indicate corresponding parts in all views, and in which:

Figure 1 is a front elevational view of my device;

Figure 2 is a cross sectional view, taken on the line 2—2 of Figure 1; while

Figure 3 is a perspective edge-view of one embodiment of my invention, shown for the sake of illustration, and Figure 4 is a detail view.

Referring more particularly to the drawing, 10 indicates a frame-member, made of any suitable material, for instance wood or metal, and in any desired shape or form.

In connection with the said frame and inside the latter is arranged a member, or second frame 11, made of a transparent, translucent or semi-transparent material, such as glass, celluloid, etc. The said second frame may consist of one single member, as shown in Figure 1, or the said frame may be made up of a number of members or strips of any form or shape, such as glass tubes, rods, flat strips, etc. Naturally the said transparent member may have any desired color.

While as described the transparent frame is arranged inside the first, preferably non-transparent, frame and held in place by the latter; there is, however, nothing to prevent this arrangement from being inverse, or to have the transparent, or second frame mounted outside upon the first or non-transparent frame 10.

In connection with the first arrangement, as described, and shown in the drawing a third frame 12, made of a non-transparent material, is arranged inside of the transparent frame and held in place by the latter.

The said frames naturally may be assembled in any convenient manner, and separate means, if desired, may be employed for securing the said frames in a tight interrelated position, or the said frame members may be formed with indentations or curvatures to register with one another; the transparent frame, for instance, may be made or formed in one single piece.

The said frame, as a whole, may be used for different purposes, such as advertising, in which case a display of the matter relevant thereto naturally would appear within the said frame. There is, however, nothing to prevent the translucent or transparent frame member from being used also for a similar purpose, independent of or in addition to whatever advertising matter that may be displayed in the space within the frame proper.

For the sake of example an embodiment is shown in Figure 3, where a suitable light arrangement is provided for the said frame in order to impart to the latter the desired effect.

Other means and different arrangement may however be employed for the sake of imparting a particular illuminous or glaring effect to the said transparent or translucent frame member.

It is obvious that changes may be made in the form, construction and arrangement of the several parts, as shown, within the scope of the appended claim, without departing from the spirit of the invention, and I do not therefore limit myself to the construction and arrangement shown and described herein.

What I claim as new, and desire to secure by Letters Patent of the United States, is:

A compound-frame for illuminating advertising matters comprising, in combination, three individual frame-members arranged one inside of the other, each of said frame-members forming a completely closed and independent unit by itself, and the different frames in consecutive order from the circumference towards the centre of the compound-frame consisting alternately of non-transparent and transparent materials, the outer frames being formed with curvatures upon their inner sides for engaging and secuing the center frame-member, the sides of the latter being of a cylindrical shape in cross-section, the front contours of the said frame-members lying in the same imaginary plane.

Signed at New York city in the county of New York and State of New York this 2nd day of July A. D. 1931.

LIONEL L. SLAVIN.